United States Patent [19]

Matsunai

[11] Patent Number: 5,357,350
[45] Date of Patent: Oct. 18, 1994

[54] IMAGE FORMING APPARATUS

[75] Inventor: Tomohiro Matsunai, Kawasaki, Japan

[73] Assignee: Kabushiki Kaisha Toshiba, Kanagawa, Japan

[21] Appl. No.: 196,286

[22] Filed: Feb. 14, 1994

[30] Foreign Application Priority Data

Mar. 23, 1993 [JP] Japan ................... 5-063751

[51] Int. Cl.$^5$ .............................. H04N 1/32
[52] U.S. Cl. ................... 358/468; 358/400; 358/401; 379/100; 379/355
[58] Field of Search ............ 358/400, 401, 468, 44 Z; 379/100, 355

[56] References Cited

FOREIGN PATENT DOCUMENTS 2-265356 10/1990 Japan .................... H04N 1/00

*Primary Examiner*—Edward L. Coles, Sr.
*Assistant Examiner*—Thomas L. Stoll
*Attorney, Agent, or Firm*—Limbach & Limbach

[57] ABSTRACT

An intelligent image forming apparatus according to the present invention comprises an image reading unit for reading image data of a document, an image forming unit for forming a copied image based on the image data read by the image reading unit, an encoding unit for converting the image data into a signal which is transmissible through a facsimile channel, a console panel with numerical keys for inputting numeric data such as the number of copies and facsimile numbers, and a control unit for counting the number of input numeric data items and supplying the image data read by the image reading unit to one of the image forming unit and encoding unit.

4 Claims, 5 Drawing Sheets

IMAGE FORMING APPARATUS

BACKGROUND OF THE INVENTION

1. Field of the Invention

The present invention relates to an image forming apparatus incorporating an image reading device, a printer device, a telecommunication device, and the like.

2. Description of the Related Art

Nowadays an intelligent plane paper copy machine (hereinafter referred to as intelligent PPC) capable of not only reading an image of a document and copying the image but also transmitting the image to a remote facsimile apparatus through a telecommunication line, is proposed.

This type of intelligent PPC includes a reading device for transmitting image data to a facsimile apparatus, a printer apparatus, an information storing apparatus, or the like, and a printer device for forming an image based on image data supplied from an external device such as a host computer and a wordprocessor, or the like. They can be operated alone or in combination.

The intelligent PPC has an image reading unit for reading image data of a document, a signal converting unit for converting the image data read by the image reading unit into an electrical signal, an image forming unit for forming an image based on the image data read by the image reading unit, a paper feeding unit for feeding paper therein and feeding the paper to which the formed image is transferred, outside the PPC, and a control unit for energizing the units.

The image reading unit reads image data of a document as intensity of light, converts the image data into an electrical signal through a photoelectric conversion element, and stores the electrical signal in a memory.

The signal converting unit converts the electrical signal stored in the memory into bit map data (copy signal) used for forming an image of the document by means of the image forming unit and parallel or serial data (encoded data) which is to be transmitted via the telecommunication line.

The image forming unit forms an image on a photosensitive body in response to the copy signal generated by the signal converting unit and transfers it to paper fed by the paper feeding unit.

The control unit performs as a reading device for reading numeric data such as the number of copies, a magnification, and a facsimile number of a destination. The control unit is capable of selecting one of various modes for performing operations of the reading device, the facsimile apparatus, and the printer device independently or simultaneously and receives control signals for interrupting the operations through a control panel, thereby controlling the entire operation of the intelligent PPC.

However, a generally-used intelligent PPC is initialized in a copy mode to serve as a copying machine when power is on. If, therefore, the intelligent PPC is used as a facsimile apparatus, the copy mode has to be switched to a facsimile mode by using a mode selection key or the like.

There is a strong possibility that the intelligent PPC will be operated in the facsimile mode though it is set in the copy mode and, in this case, an undesired copy is obtained. This causes drawbacks wherein copying sheets and toners are wasted and protective secret information is supplied (left) as hard copy. Furthermore, it causes drawbacks wherein a user has to wait for a long time when his or her preceding user has made a mistake, thereby decreasing in operation efficiency.

SUMMARY OF THE INVENTION

The present invention has been developed to resolve the above drawbacks and its object is to provide an image forming apparatus which is easy to operated and hard to cause an error in operation.

According to one aspect of the present invention, an image forming apparatus, comprising:

means for reading a document to output image data therefrom;

means for forming an image on an image bearing member based on the image data from the reading means;

means for transmitting the image data from the reading means outside through a communication line;

means for inputting a numeric value to set the numeric value input by the inputting means as the number of times of an image forming operation by the forming means, and to set the numeric value as a number for specifying a destination which is to be output from the reading means by the transmitting means;

means for detecting the number of figures of the numeric value input by the inputting means; and means for controlling the forming means and the transmitting means to perform one of the image forming operation and a transmitting operation in accordance with the number of figures detected by the detecting means.

According to another aspect of the present invention, an image forming apparatus comprising:

means for reading of a document to output image data therefrom;

means for forming an image on an image bearing member based on the image data from the reading means;

means for transmitting the image data from the reading means outside through a communication line;

means for inputting a numeric value to set the numeric value input by the inputting means as the number of times of an image forming operation by the forming means, and to set the numeric value as a number for specifying a destination which is to be output from the reading means by the transmitting means;

means for detecting the number of figures of the numeric value input by the inputting means; and means for controlling one of the forming means and the transmitting means to perform one of the image forming operation and a transmitting operation based on the numeric value input by the inputting means, the controlling means control the forming means when the number of figures of the numeric value detected by the detecting means is smaller than a predetermined number, and the controlling means control the transmitting means when the number of figures is larger than the predetermined number.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An image forming apparatus according to an embodiment of the present invention will now be described, with reference to the accompanying drawings.

Figure 1:
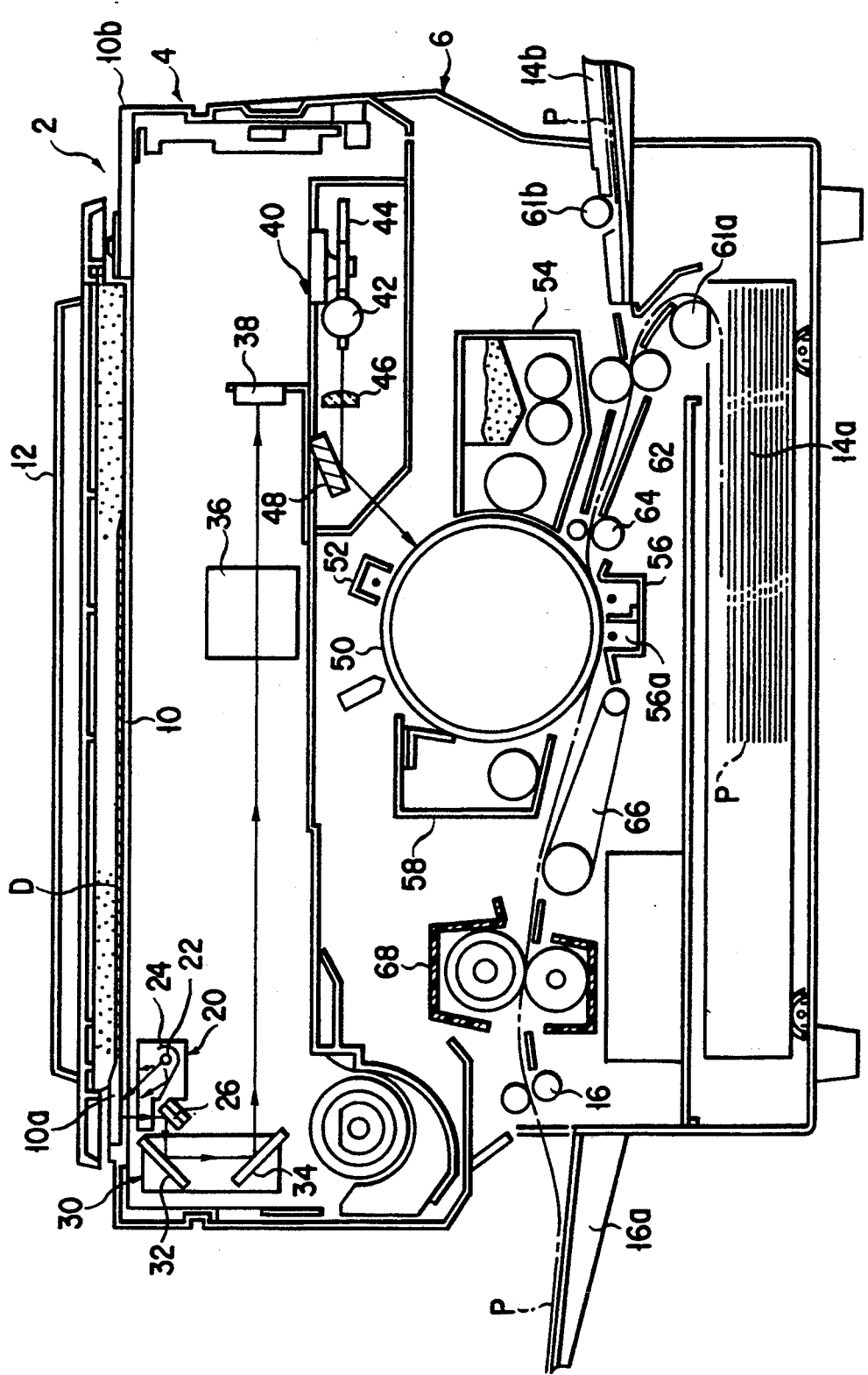
FIG. 1 is a schematic front view of a digital copying machine incorporating an image forming apparatus according to an embodiment of the present invention.

As shown in FIG. 1, the image forming apparatus, that is, an intelligent PPC 2 incorporates an image reading unit 4 and an image forming unit 6. The image reading unit 4 includes a document table 10 on which documents D are placed as objects to be read, a size plate 10a for indicating a position of the documents D, and a document presser 12 for pressing the documents D on the document table 10.

Under the document table 10, a first carriage 20 is disposed which includes an illuminating lamp 22 for illuminating the documents D placed on the document table 10, a reflection plate 24 for concentrating light from the illuminating lamp 22 upon the documents D, a first mirror 26 for picking up the light reflected by the documents D, and the like. The first carriage 20 is moved in parallel with the document table 10 by means of a belt with teethed belt (not shown) and a pulse motor (not shown).

A second carriage 30, which is moved by the teethed belt driving the first carriage 20 and moved in parallel with the document table 10 at half the speed of the first carriage 20, is arranged in the direction in which the light from the first mirror 26 of the first carriage 20 is transmitted. The second carriage 30 includes a second mirror 32 for reflecting the light reflected by the first mirror 26 and a third mirror 34 for reflecting the light reflected by the second mirror 32. These second and third mirrors are arranged at a 90°, angle to each other.

Under the document table 10, an image forming lens 36, which can be moved by a driving mechanism (not shown), for concentrating the light reflected by the second carriage 30 and forming an image from the concentrated light at a desired magnification by its own movement, and a CCD sensor 38 for photoelectrically converting the image formed by the image forming lens 36 into an electrical signal and supplying the signal to an image memory 72 (which will be described later).

The image forming unit 6 includes an exposure unit 40 for forming an electrostatic latent image on a photosensitive body (mentioned later) in accordance with image information of the documents D read out by the image reading unit 4 and directing the light to the photosensitive body. The exposure unit 40 includes a semiconductor laser device 42, a first lens (not shown) for concentrating the laser beam emitted from the laser device 42 and converting the laser beam into a laser beam having a section almost circular, a light deflection device 44 for deflecting the laser beam in the axial direction of the photosensitive body, a second lens 46 for conforming a distance from the optical axis of the photosensitive body to a position which determined in accordance with a deviation angle of the laser beam to a distance from the optical axis of the photosensitive body to a position where an image is to be formed from the laser beam, and a mirror 48 for reflecting the laser beam toward the photosensitive body.

The photosensitive body 50 for forming an electrostatic latent image by the laser beam from the exposure unit 40, is disposed in the central part of the image forming unit 6. A charge unit 52 for charging the photosensitive body 50, a development unit 54 for supplying toners to the electrostatic latent image and developing it, a transfer unit 56 incorporating an AC voltage application device 56a for separating paper P fed from a paper cassette (which will be described later) from the photosensitive body, for transferring a toner image formed on the photosensitive body 50 to paper P, and a cleaning unit 58 for eliminating the charges distributed over the photosensitive body 50, returning the charge characteristics of the photosensitive body 50 to its initialization, and removing the toners remaining on the photosensitive body 50, are arranged in this order around the photosensitive body 50.

A paper cassette 14a for feeding paper sheets P such as copy paper and OHP sheets toward the photosensitive body 50, is inserted under the photosensitive body 50. A bypass tray 14b for feeding paper sheets P having different sizes one by one, is arranged upstream in the feed direction of the paper sheets P. Between the photosensitive body 50 and the paper cassette 14a, a paper feed roller 61a for picking up the paper sheets P from the cassette 14a one by one, a paper feed roller 61b for feeding the paper sheets P supplied from the bypass tray 14b, a pair of supply rollers 61b for supplying the paper sheets P picked up by the paper feed roller 61a or 61b toward the photosensitive body 50, a paper feed path 63 for feeding the paper sheets P from a supply roller 62 to the photosensitive drum 50, and a pair of timing rollers 64 for aligning the leading edge of the toner image on the photosensitive body 50 with that of each paper sheet P and feeding the paper sheets P at the same speed as the speed at which the paper sheets P move on the periphery of the photosensitive body 50, are arranged.

A conveyor device 66 for conveying the paper sheets P to which the toner image is transferred from the photosensitive body 50 and to which the toners are electrostatically attached, a fixing device 68 for fixing the toners onto the paper sheets P by heat, a pair of discharge rollers 16 for discharging the paper sheets P outside the PPC 2, and a discharge tray 16a, which is next to the pair of discharge rollers 16, for stocking the paper sheets P on which the toner images are fixed, are arranged downstream in the feed direction of the paper sheets P.

Figure 2A:
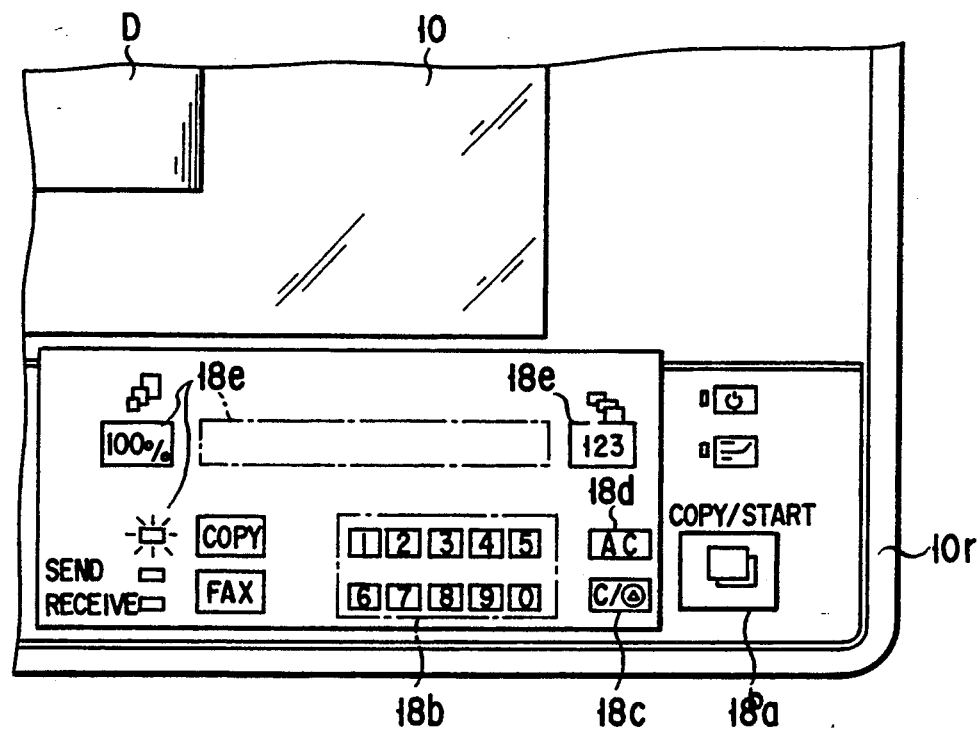
FIGS. 2A and 2B are schematic plan views each showing an operation panel incorporated into the copying machine of FIG. 1 and an example of display on the operation panel.

According to FIG. 2A, the image reading unit of the intelligent PPC 2 includes a cover 10b for surrounding the document table 10 and a console panel 18 incorporated into the cover 10b and capable of inputting various data items (control signals) to perform a copying operation and read image data.

The console panel 18 incorporates a print (start) key 18a for outputting a copying start signal and a facsimile transmission start signal, a numeric key 18b for outputting numeric signals corresponding to 0 to 9 used for a facsimile number, the number of copies, a magnification, and the like, a stop key 18c for returning the input data to "0" and stopping a copying operation or a document reading operation for facsimile transmission, an all-clear key 18d for stopping all operations to return the operation of the PPC2 to the initial state, and a display section 18e for displaying the preset number of copies, the present magnification, an input facsimile number, etc.

Figure 2B:
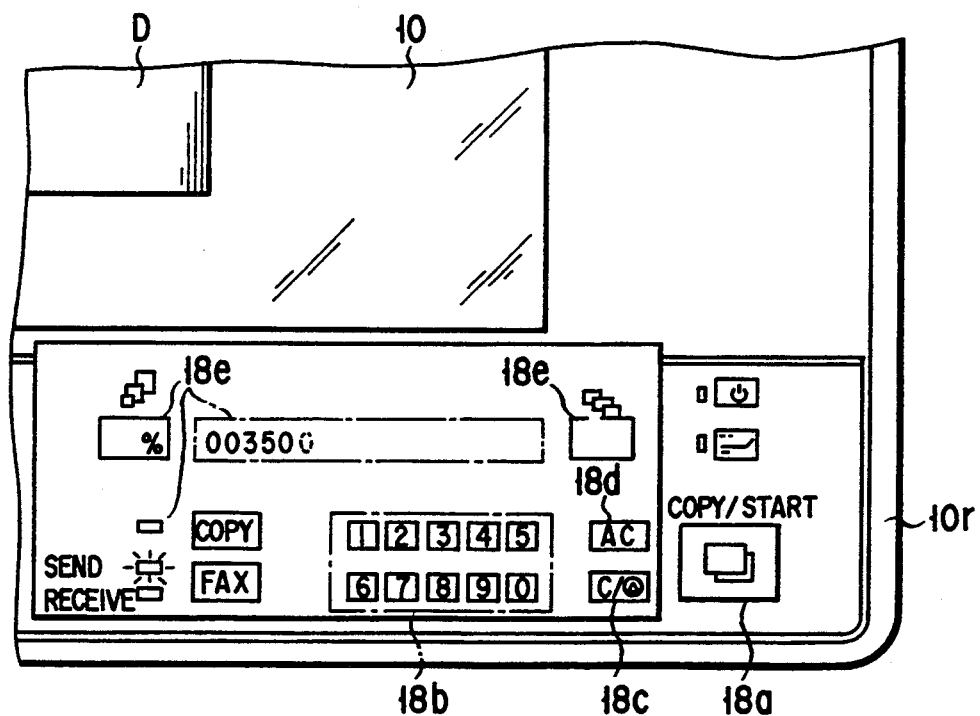
Figure 4:
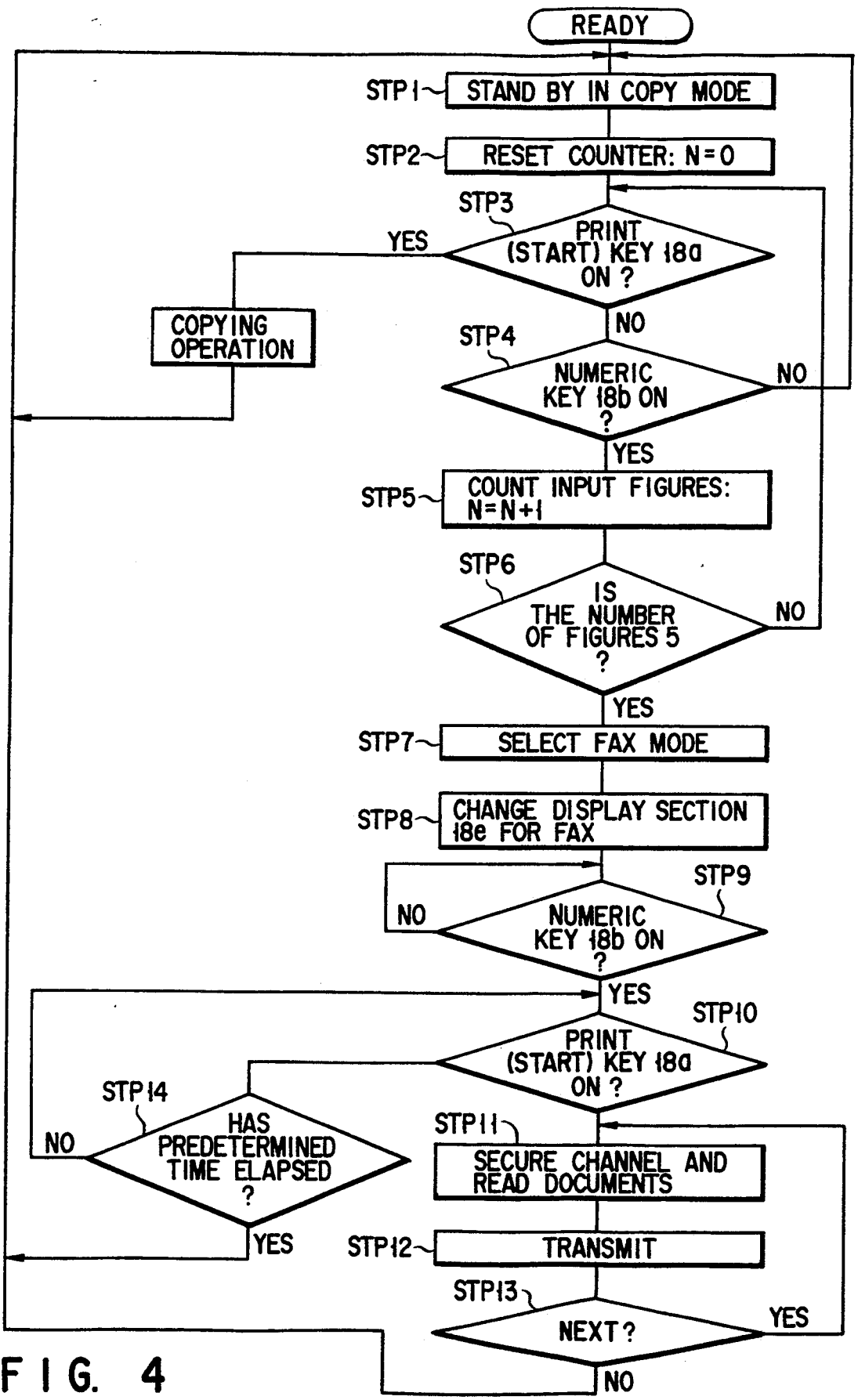
FIG. 4 is a flowchart showing an example of control for switching the copying machine of FIG. 1 from a copy mode to a facsimile mode.
Figure 5:
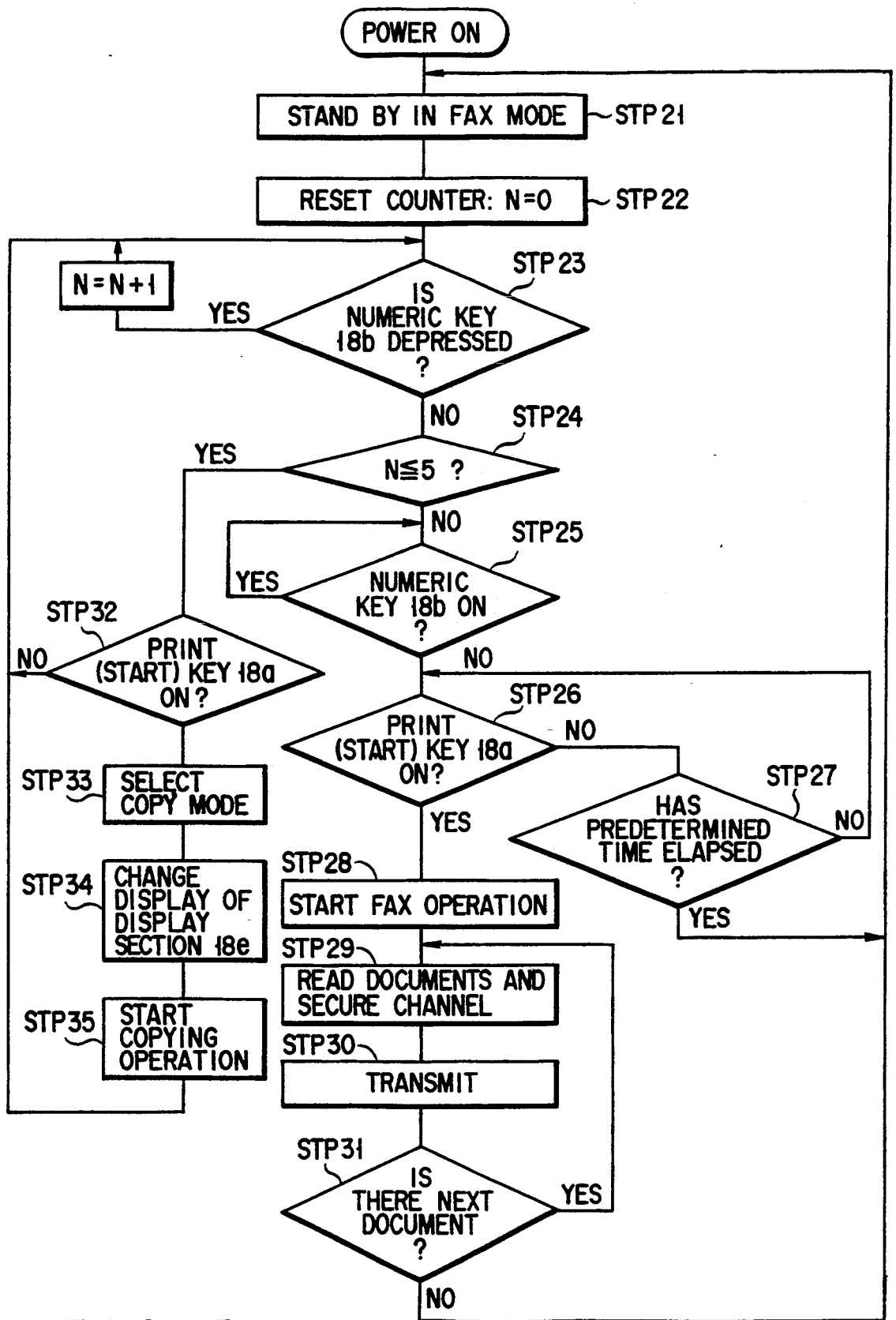
FIG. 5 is a flowchart showing an example of control for switching the copying machine of FIG. 1 from the facsimile mode to the copy mode.

FIG. 2B shows an example of a change from the copy mode to the facsimile mode of the intelligent PPC 2 in accordance with the flowchart shown in FIGS. 4 or 5. For example, the change from the copy mode to the facsimile mode is detected by display of the facsimile number on the display section 18e of the console panel 18 and change in location where a mode display LED is lit.

Figure 3:
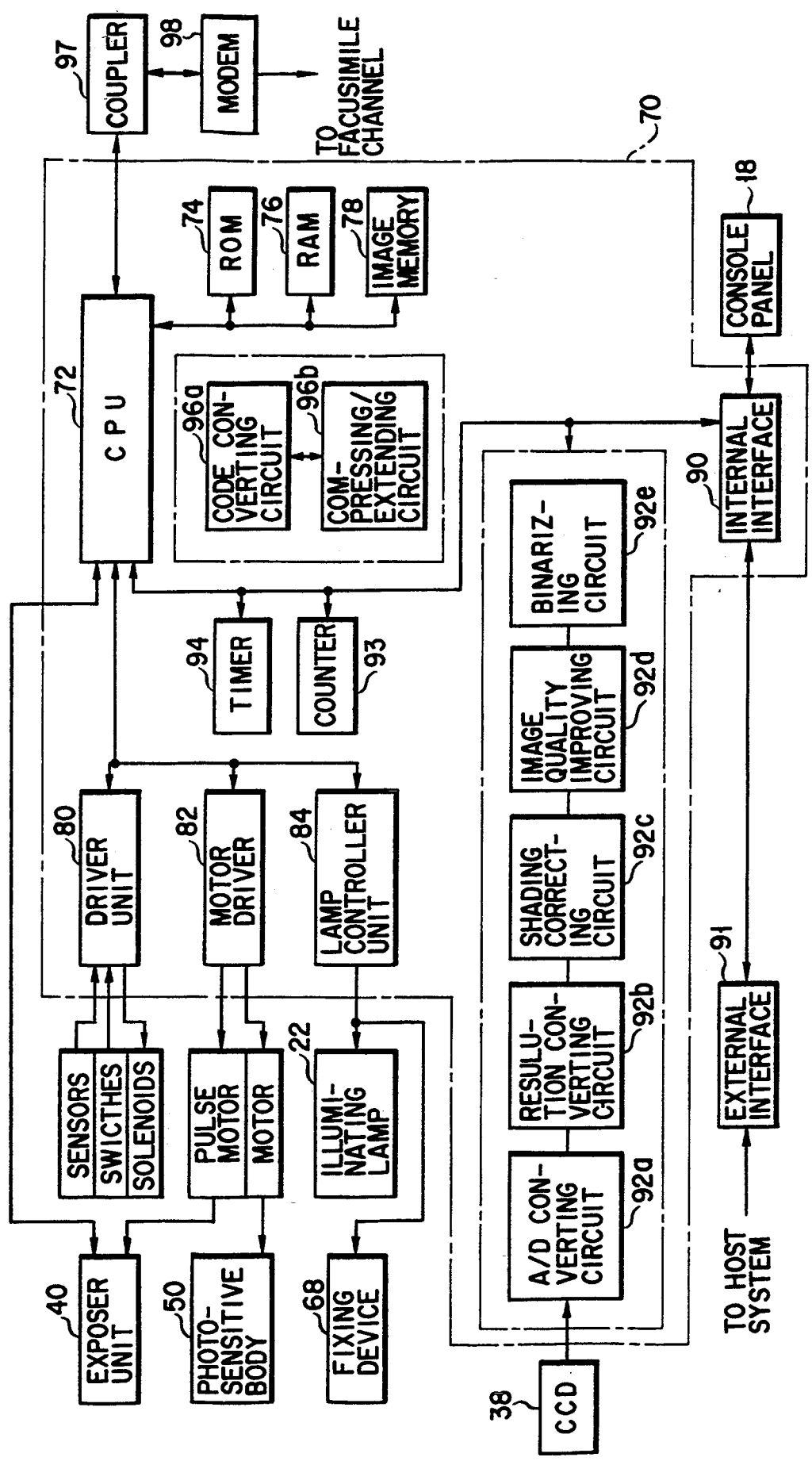
FIG. 3 is a block diagram schematically showing a control device incorporated into the copying machine of FIG. 1.

As shown in FIG. 3, a main control unit 70 for controlling the image reading unit 4 and image forming unit of the PPC 2, includes a CPU 72 serving as a main controller, a ROM 74 connected to the CPU 72, for storing data of rules for operating the PPC 2, a RAM 76 for storing numeric data input from the console panel 18, for example, the number of copies, a magnification, and a facsimile number, and the number of times the numeric key 18b is depressed, that is, the number of numeric data items, and an image memory 78 for temporarily storing a digital signal into which an image signal output from the CCD sensor 38 is converted through an A/D converting circuit 92a (which will be described later). The image data stored in the image memory 78 is converted into binary data through a signal conversion unit 92 (which will be described later).

A driver unit 80 for driving a group of switches for detecting the position of the paper P and the amount of paper remaining in the paper cassette, and a solenoid, a motor driver 82 for driving a motor for energizing the first and second carriages 20 and 30, the photosensitive body 50, the development unit 54, and a lamp controller unit 84 for lighting the illuminating lamp 22, a fixing heater, etc. are connected to the CPU 72.

Furthermore, an internal interface 90 for causing the CPU 72 to read numeric data input by the console panel 18, an external interface 91 for inputting an image signal different from an image signal supplied from the image reading unit 4, for example, an image signal supplied from an external device (not shown) necessary for using the image forming unit 6 as a printer device, such as a host computer or wordprocessor, a signal converting unit 92 for converting image data of the document D stored in the image memory 78 into binary data which is to be output from the image forming unit 6, a counter 93 for counting the number of numeric data items input by the console panel 18 (the number of figures of numeric data input by the numeric key 18b), and a timer 94 for measuring the time set in response to various input signals, e.g., the time for waiting for input signals in plural operation modes, are connected to the CPU 72.

Moreover, an encoding unit 96 for converting image data read by the image reading unit 4 into binary data which is to be transmitted to an external facsimile apparatus connected thereto through a telecommunication line (not shown), and a coupler (connection module) 97 and a MODEM 98 for connecting the facsimile apparatus (telecommunication lines) and the PPC 2, are connected to the CPU 72.

The signal converting unit 92 includes an A/D converting circuit 92a for converting an analog image signal output from the CCD sensor 38 into a digital signal, a resolution converting circuit 92b for matching image data supplied to the CCD sensor 38 at its proper resolution to the resolution of the image forming unit 6, a shading correcting circuit 92c for correcting a variation in threshold level of a signal which is converted into a digital signal by the A/D converting circuit 92a with respect to an output signal supplied from the CCD sensor 38, the variation being due to a population difference of the CCD sensor 38 and in its ambient temperature, an image quality improving circuit 92d for separating the image data passing through the shading correcting circuit 92c into a luminance signal, a color-difference signal, and the like and subjecting the signals to filtering, trimming, masking, edge emphasis, character specification, and the like, and a binarizing circuit 92e for varying the intensity of light emitted from the laser device 42 of the exposure unit 40 based on the image data output from the image quality improving circuit 92d.

The encoding unit 96 includes a code converting circuit 96a for converting a code of binary data and a compressing/extending circuit 96b for compressing the code-converted data in the transmission mode and extending the compressed data in the reception mode. The encoding unit 96 converts the image data stored in the image memory 78 so as to be adaptable to a facsimile channel.

The coupler 97 and MODEM 98, which connect the PPC 2 and the telecommunication lines, provides a modulation method suitable for the telecommunication lines.

FIG. 4 is a flowchart of an operation of the intelligent PPC 2 shown in FIGS. 1 to 3.

When a power supply (not shown) of the PPC 2 is turned on, the PPC is initialized by the CPU 72 in accordance with an initializing operation data of which is stored in the ROM 74, and a copy mode in which the PPC 2 serves as a copying apparatus is set (STP 1). Then the counter 93 for counting the number of times (input figures) the numeric key 18b is turned on, is reset (N=0) (STP 2).

After this, it is checked whether the print (start) key 18a is turned on (STP 3). If the print (start) key 18a is turned on, a normal copying operation is performed (STP 3 - Y).

If the print (start) key 18a is not turned on (STP 3 - N), whenever the numeric key 18b is turned on (STP 4 - Y), the number of times (input figures) inputting by the key 18b is turned on is counted (STP 5). It is then checked whether the figures N input until the print (start) key 18a is turned on reach numeric data, e.g., "5" which is difficult to be regarded as the number of copies or a magnification (STP 6).

If the number of figures N of numeric data input by the numeric key 18b is less than "5", the flow is returned to the STP 3, thus continuing a state in which copying can be performed (STP 6 - N).

If the number of figures N input by the numeric key 18b attains "5" (STP 6 - Y), a mode change program stored in the ROM 74, is read out to change the copy mode to the facsimile mode (STP 7). Then the display of the display section 18e is changed to be adapted to facsimile, for example, the input numeric data is displayed as a facsimile number (STP 8).

If further numeric data is input, it is stored in a predetermined area of the RAM 76 as a facsimile number (STP 9). When the print (start) key 18a is turned on (STP 10 - Y), a channel is secured for the input facsimile number, and image information of the first page of documents D is read by the image reading unit 4 and stored in a predetermined area of the image memory 78 (STP 11).

When the channel for the facsimile number is secured in STP 11, the image information of the first page of documents D is transmitted from the image memory 78 (STP 12). The image information of documents D continues to be read until the number of remaining documents becomes "0" (STP 13).

If none of the keys such as the print (start) key 18a, numeric key 18b, and clear key 18c are turned on for a predetermined period of time after the copy mode is changed to the facsimile mode, the mode is returned to the copy mode set in STP 1 after a lapse of predetermined time, e.g., 30 seconds set by the timer 94 (STP 14 - Y).

An operation of the image forming apparatus (PPC) 2 will now be described in detail, with reference to the flowchart shown in FIG. 4.

One of the copy mode and facsimile mode is selected in accordance with the number of numeric values (figures) input by the numeric key 18b of the console panel 18.

When the print (start) key 18a is turned on, the illuminating lamp 22 is lit, and a pulse motor (not shown) is driven to move the first and second carriages 20 along the document table 10, thereby guiding light (image data) reflected by documents D to the CCD sensor 38.

The light guided to the CCD sensor 38 is supplied to the signal converting unit 92 and converted from an analog signal to a digital signal by means of the A/D converting circuit 92a. The digital signal is supplied through the resolution converting circuit 92b and shading correcting circuit 92c and stored in the image memory 78.

Since the facsimile mode is set when the number of figures N input by the numeric key 18b is 5 or more, the image data of documents D is transmitted from the image memory 78 to the encoding unit 96, and its code is converted by the code converting circuit 96a on the basis of a predetermined rule. The code-converted image data is compressed by the compressing/extending circuit 96b. The compressed data is supplied to a facsimile channel (not shown) through the coupler 97 and MODEM 98, and then to a facsimile apparatus which is the destination of facsimile input by the numeric key 18b.

On the other hand, since the copy mode is set when the number of figures N input by the numeric key 18b is 4 or less, the image data of documents D is supplied from the image memory 78 to the image forming unit 6, and an image is formed in accordance with the following copying process.

The image data stored in the image memory 78 is converted into a binary print signal by the image quality improving circuit 92d and binarizing circuit 92e, and the binary print signal is converted into serial data by a parallel/serial conversion circuit (not shown). The serial data is supplied to the exposure unit 40 of the image forming unit 6 through the internal interface 90.

In the image forming unit 6, when the copy mode is set, the motor (not shown) is driven and the photosensitive body 50 is rotated at a desired speed. At the same time, desired charges are supplied from the charge unit 52 to the photosensitive body 50.

The laser beam, whose intensity is modulated in response to a print signal, is emitted from the laser device 42 of the exposure unit 40 to the photosensitive body 50 to form an electrostatic latent image corresponding to the print signal (image data) on the photosensitive body 50. This electrostatic latent image is developed by toner supplied from the development unit 54 and transferred to paper P as a toner image by means of the transfer unit 56.

The toner image transferred to the paper P is supplied to the fixing device 68 by the supply device 66 to be fixed to the paper P.

The paper P to which the toner image is fixed, is discharged to the discharge tray 16a or a sorter (not shown) provided outside the PPC 2.

FIG. 5 is a flowchart showing a different operation of the PPC 2 than that of the PPC shown in FIG. 4.

When a power supply (not shown) of the PPC 2 is turned on, the PPC is initialized by the CPU 72 in accordance with an initializing operation data of which is stored in the ROM 74, and a facsimile mode in which the PPC 2 serves as a facsimile apparatus is set (STP 21). Then the counter 93 for counting the number of times (input figures) the numeric key 18b is turned on, is reset (N=0) (STP 22).

Whenever the numeric key 18b is turned on, the number of times (input figures) of the turn-on is counted (STP 23. It is then checked whether the input figures N is less than numeric data, e.g., "5" which is difficult to be determined as the number of copies or a magnification (STP 24).

Since the number of figures N input by the numeric key 18b is 5 or more (STP 24 - N), the input numeric data and its subsequent input numeric data are stored in a predetermined area of the RAM 76 as a facsimile number (STP 25), and a standby state continues until a start signal is input by the print (start) key 18a (STP 26). At the same time, the timer 94 is turned on to count the time required until the print (start) key 18a is tuned on. (STP 27).

When the print (start) key 18a is turned on (STP 26 - Y), the PPC 2 is set in the facsimile mode (STP 28), a channel is secured for the input facsimile number, and image information of the first page of documents D is read by the image reading unit 4 and stored in a predetermined area of the image memory 78 (STP 29).

When the channel for the facsimile number is secured in STP 29, the image information of the first page of documents D is transmitted from the image memory 78 (STP 30). The image information of documents D continues to be read until the number of remaining documents becomes "0" (STP 31).

If in STP 26 the print (start) key 18a is not turned on but a predetermined period of time, e.g., 30 seconds are counted by the timer 94, the flow is returned to STP 21, in which the input numeric data is cleared, and the transmission standby is returned to the normal input standby (STP 27 - Y).

If the number of figures N input by the numeric key 18b is less than "5" (STP 24 - Y), the print (start) key 18a is turned on (STP 32 - Y) to determine the input numeric data as data of the number of copies, thus setting the PPC 2 in the copy mode (STP 33).

Subsequently, the display of the display section 18e is changed by the CPU 72 so as to be adapted to facsimile, for example, the input numeric data is displayed as a facsimile number (STP 34). After this, the normal copying operation is performed (STP 35). If the print (start) key 18a is not turned on but a predetermined period of time, for example, 30 seconds has elapsed, the mode is returned to the facsimile standby mode of STP 21 (STP 32 - Y).

As described above, the image forming apparatus according to the present invention has image forming means for forming an image based on image data, converting means for converting the image data into a signal suitable for transmission using a telecommunication line, and counting means for counting the number of numeric data items input by input means. Any one of the image forming means and converting means is energized based on the number counted by the counting means.

If, therefore, a large number of numeric data items, which differ from the number of numeric data items for indicating the number of images formed by the image forming means, are input, the numeric data items can be determined as data for transmitting the image data through the communication line and, when the numeric data is input, the means to be energized can be changed from the image forming means to the converting means.

More specifically, if the number of times the numeric key of the console panel is turned on, is counted, it is determined whether the input numeric data represents the number of copies or a facsimile number, thereby selectively setting the copy mode and facsimile mode in accordance with the input numeric data.

It is thus unnecessary to change the copy mode to the facsimile mode when an image of a document is transmitted by facsimile. It is possible to prevent a document to be facsimiled from being copied by mistake. Furthermore, the cost of copy is decreased and the operation efficiency is improved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image forming apparatus, comprising:
    means for reading a document to output image data therefrom;
    means for forming an image on an image bearing member based on the image data from said reading means;
    means for transmitting the image data from said reading means outside through a communication line;
    means for inputting a numeric value to set the numeric value input by said inputting means as the number of times of performing an image forming operation by said forming means, and to set the numeric value as a number for specifying a destination which is to receive the output from said reading means by said transmitting means;
    means for detecting the number of figures of the numeric value input by said inputting means; and
    means for controlling said forming means and said transmitting means to perform one of the image forming operation and a transmitting operation in accordance with the number of figures detected by said detecting means.

2. An image forming apparatus according to claim 1, wherein said controlling means causes the performance of the transmitting operation when the number of figures of the numeric value input by said inputting means is 5 or more.

3. An image forming apparatus according to claim 1, wherein said controlling means causes the performance of the image forming operation when the number of figures of the numeric value input by said inputting means is 4 or less.

4. An image forming apparatus comprising:
    means for reading of a document to output image data therefrom;
    means for forming an image on an image bearing member based on the image data from said reading means;
    means for transmitting the image data from said reading means outside through a communication line;
    means for inputting a numeric value to set the numeric value input by said inputting means as the number of times of performing an image forming operation by said forming means, and to set the numeric value as a number for specifying a destination which is to receive the output from said reading means by said transmitting means;
    means for detecting the number of figures of the numeric value input by said inputting means; and
    means for controlling one of said forming means and said transmitting means to perform one of the image forming operation and a transmitting operation based on the numeric value input by said inputting means, said controlling means controls said forming means when the number of figures of the numeric value detected by said detecting means is smaller than a predetermined number, and said controlling means controls said transmitting means when the number of figures is larger than the predetermined number.

* * * * *